United States Patent
Jin et al.

(10) Patent No.: US 8,017,234 B2
(45) Date of Patent: Sep. 13, 2011

(54) STRUCTURAL OBJECT COATED WITH SUPERHYDROPHOBIC NANOSTRUCTURE COMPOSITE AND PROCESS FOR PRODUCING THE SAME

(75) Inventors: Ren-Hua Jin, Sakura (JP); Jian-Jun Yuan, Sakura (JP)

(73) Assignees: DIC Corporation, Tokyo (JP); Kawamura Institute of Chemical Research, Sakura-shi, Chiba (JP)

(*) Notice: Subject to any disclaimer, the term of this patent is extended or adjusted under 35 U.S.C. 154(b) by 0 days.

(21) Appl. No.: 12/737,128

(22) PCT Filed: May 25, 2009

(86) PCT No.: PCT/JP2009/059506
§ 371 (c)(1),
(2), (4) Date: Feb. 11, 2011

(87) PCT Pub. No.: WO2009/150930
PCT Pub. Date: Dec. 17, 2009

(65) Prior Publication Data
US 2011/0160374 A1 Jun. 30, 2011

(30) Foreign Application Priority Data

Jun. 12, 2008 (JP) ................................. 2008-154121
Jan. 16, 2009 (JP) ................................. 2009-007500

(51) Int. Cl.
*D02G 3/00* (2006.01)
(52) U.S. Cl. .................. 428/376; 428/34.5; 427/407.1; 427/372.2; 427/384; 427/430.1; 427/385.5
(58) Field of Classification Search .................. 428/376, 428/372, 34.5; 427/372.2, 384, 385.5, 407.1, 427/419.2, 430.1
See application file for complete search history.

(56) References Cited

U.S. PATENT DOCUMENTS
7,435,450 B2 * 10/2008 Chen et al. ................. 427/402
(Continued)

FOREIGN PATENT DOCUMENTS
JP 61-065128 5/1986
(Continued)

OTHER PUBLICATIONS

Sun T. et al., "Bioinspired Surfaces with Special Wettability," Acc. Chem. Res., 2005, 38, pp. 644-652.
(Continued)

*Primary Examiner* — N. Edwards
(74) *Attorney, Agent, or Firm* — Edwards Angell Palmer & Dodge LLP

(57) ABSTRACT

The present invention relates to a structural object coated with a superhydrophobic nanostructure composite, the structural object being obtained by densely coating a surface of a solid substrate having a desired shape with a nanostructure obtained by combining a polymer having a polyethyleneimine skeleton with silica on the nanometer order, and bonding a hydrophobic group to the surface of the nanostructure, and a process for producing the structural object. The present invention also relates to a structural object coated with a superhydrophobic nanostructure composite, the structural object being obtained by removing the polymer having the polyethyleneimine skeleton from the nanostructure and bonding a hydrophobic group to the surface of the residual nanostructure containing silica as a main constituent component, and a process for producing the structural object. Furthermore, the present invention provides a method of using the structural object as a container for transferring an aqueous solution.

7 Claims, 6 Drawing Sheets

U.S. PATENT DOCUMENTS

| | | | | |
|---|---|---|---|---|
| 7,645,828 | B2 * | 1/2010 | Jin et al. | 524/493 |
| 7,670,509 | B2 * | 3/2010 | Jin et al. | 252/500 |
| 2006/0029808 | A1 | 2/2006 | Zhai et al. | |

FOREIGN PATENT DOCUMENTS

| | | | |
|---|---|---|---|
| JP | 2000-146033 | A | 5/2000 |
| JP | 2003-238947 | A | 8/2003 |
| JP | 2005-264421 | A | 9/2005 |
| JP | 2005-336440 | A | 12/2005 |
| JP | 2006-063097 | A | 3/2006 |
| JP | 2007-051056 | A | 3/2007 |
| JP | 2008-039130 | A | 2/2008 |
| JP | 2008-508181 | A | 3/2008 |
| JP | 2009-057263 | A | 3/2009 |

OTHER PUBLICATIONS

Li, M. et al., "Polypyrrole nanofiber arrays synthesized by a biphasic electrochemical strategy," J. Mater. Chem., 2008, 18, pp. 2276-2280.

Feng, X. et al., "Reversible Super-hydrophobicity to Super-hydrophilicity Transition of Aligned ZnO Nanorod Films," J. Am. Chem. Soc., 2004, 126, pp. 62-63.

Erbil, H. Y. et al., "Transformation of Simple Plastic into a Superhydrophobic Surface," Science, 2003, 299, pp. 1377-1380.

International Search Report dated Jun. 16, 2009, issued for PCT/JP2009/059506.

* cited by examiner

STRUCTURAL OBJECT COATED WITH SUPERHYDROPHOBIC NANOSTRUCTURE COMPOSITE AND PROCESS FOR PRODUCING THE SAME

TECHNICAL FIELD

The present invention relates to a structural object coated with a superhydrophobic nanostructure composite, the structural object being obtained by densely coating a surface of a solid substrate having a desired shape with a nanostructure obtained by combining a polymer having a polyethyleneimine skeleton with silica on the nanometer order and bonding a hydrophobic group to the surface of the nanostructure, and a process for producing the structural object. The present invention also relates to a structural object coated with a superhydrophobic nanostructure composite, the structural object being obtained by removing the polymer having the polyethyleneimine skeleton from the nanostructure and bonding a hydrophobic group to the surface of the residual nanostructure containing silica as a main constituent component, and a process for producing the structural object. Furthermore, the present invention relates to a method of using the structural object as a container for transferring an aqueous solution.

BACKGROUND ART

When a water droplet contacts a solid surface, a contact angle range of 70° to 150° where the water droplet contacts the surface is defined as hydrophobicity, and a contact angle range of 150° or more where the water droplet contacts the surface is defined as superhydrophobicity. In particular, on a solid surface having a water contact angle of 170° or more, water droplets roll off the surface and a clean state is maintained for a long time without leaving a trace of contact with water. In other words, it is expected that even after an aqueous solution is allowed to flow into a container or the like having a superhydrophobic surface, a completely clean state can be maintained without leaving even droplets of the solution on the inner wall of the container, and the container can be repeatedly used without washing. However, it is difficult to exhibit superhydrophobicity using only a molecule residue having a low surface tension.

On the other hand, many living matters of the natural world exhibit superhydrophobicity. For example, lotus leaves, rice plant leaves, cabbage leaves, and the like have superhydrophobicity in which water droplets are completely repelled. For example, it is known that the superhydrophobicity of a lotus leaf is deeply related to the surface structure of the leaf. Specifically, nanofibers extend throughout the entire surface to form a surface layer, micron-sized projections similar to aggregates of nanofibers make up an outermost layer on the surface layer at certain intervals, and hydrophobic wax is present on the surfaces of these nanofibers. As a result, water cannot adhere to the surface and rolls off the surface of the lotus leaf, and surface contaminations and the like are removed by the force of rolling, thus exhibiting a so-called self-cleaning function. This suggests that, in order to exhibit superhydrophobicity, it is most important to control the surface roughness, that is, the surface structural object and shape in the nano-dimension.

The structural principle for exhibiting superhydrophobicity, which is also called "lotus effect", has been used as a guideline for developing many methods for designing an artificial lotus-like structure. With the advancement of nanomaterials, in recent years, various techniques for providing a flat solid surface that exhibits superhydrophobicity have been developed. For example, it has been reported that the contact angle is increased to 170° or more by regularly arranging carbon nanotubes on a surface of a substrate (refer to NPL 1). Is has also been reported that the surface contact angle is controlled to be 170° or more by growing polypyrrole nanofibers on a silicon surface coated with platinum by an electrochemical process (refer to NPL 2). Furthermore, superhydrophobicity is exhibited by forming a nanocrystal seeds layer composed of zinc oxide on a surface of a glass substrate at a temperature of 400° C. or higher, and then growing a large number of rod-like zinc oxide nanofibers thereon (refer to NPL 3).

As for a simple process, for example, it has been reported that a network structure composed of polypropylene nanoparticles is formed by adding a certain poor solvent to a solution of polypropylene, casting the resultant mixture onto a surface of a substrate, and then adjusting the temperature, whereby the contact angle is increased to 160° (refer to NPL 4). Alternatively, superhydrophobicity can be exhibited by providing glass made of oxides of silicon, boron, and sodium with a phase separation structure, and etching the glass by a chemical treatment to induce an irregular structure on the surface, and lastly allowing a fluorine compound to react on the surface (refer to PTL 1). Furthermore, it is also known that a superhydrophobic surface is constructed by preparing a stacked film of a polyarylamine and polyacrylic acid, and then treating a surface of the film by a chemical method to induce a surface porous structure, immobilizing silica nanoparticles thereon, and then lastly hydrophobing with a silane coupling agent having a fluorine alkyl residue (refer to PTL 2).

Among the processes proposed above, in the cases of a superhydrophobic surface based on an inorganic material, the step of obtaining a surface roughness provided with a nanostructure is complex, and the cost is also high. In the cases of a superhydrophobic surface based on an organic polymer, although the cost is low, the solvent resistance and corrosion resistance of the resultant superhydrophobic surface are low, and furthermore, the step of obtaining a surface roughness provided with a nanostructure is also complex. Thus, there is a problem in terms of practical use. Furthermore, the processes proposed above are characterized in that the superhydrophobic surface is formed on a planar solid surface. However, no example has been reported in which a limited space, specifically, an inner wall of tubular substrate is coated with an inorganic material-based superhydrophobic surface.

A prerequisite for exhibiting superhydrophobicity is to construct a nanostructure composite surface in which micro-sized domains are scattered over the entire surface of a substrate while fibrous nanostructures densely cover the surface of the substrate. However, many studies are still necessary to ascertain which materials and which processes are beneficial for constructing such a nanostructure composite. In particular, even when only the contact angle is temporarily high and superhydrophobicity is exhibited, the superhydrophobicity often disappears after a prolonged immersion in water. Considering that exhibition of superhydrophobicity for only a short period of time does not have practical utility, developing a material that exhibits semi-permanent or permanent superhydrophobicity (super-water repellency) even while being immersed in water, and providing a simple process for producing such a material are important objectives.

CITATION LIST

Patent Literature

PTL 1: Japanese Unexamined Patent Application Publication (Translation of PCT Application) No. 2008-508181
PTL 2: U.S.P Application No. 2006/029808 specification

Non Patent Literature

NPL 1: Sun et al., Acc. Chem. Res., 2005, 38, 644-652
NPL 2: Li et al., J. Mater. Chem., 2008, 18, 2276-2280
NPL 3: Feng et al., J. Am. Chem. Soc., 2004, 126, 62-63
NPL 4: Erbil et al., Science, 2003, 299, 1377-1380

SUMMARY OF INVENTION

Technical Problem

In view of the above situation, an object to be achieved by the present invention is to provide a structural object that exhibits semi-permanent superhydrophobicity on a solid substrate having a desired shape, a simple and efficient process for producing the structural object, and an application method of the structural object.

Solution to Problem

The inventors of the present invention have conducted intensive studies in order to achieve the above object. As a result, it was found that a structural object having a superhydrophobic surface is obtained by preparing a structural object in which a nanostructure obtained by combining a polymer, which is an organic substance, with silica, which is an inorganic substance, on the nanometer order extends over the entire surface of a substrate and the nanostructure forms, as a coating film that completely covers the substrate, a nano-interface having a complicated structure on the substrate, and then performing a hydrophobizing treatment on the surface. This finding resulted in completion of the present invention.

Specifically, the present invention provides a structural object coated with a superhydrophobic nanostructure composite, the structural object having a superhydrophobic surface obtained by coating a surface of a solid substrate with a superhydrophobic nanostructure composite, wherein the superhydrophobic nanostructure composite is a composite in which a hydrophobic group is bonded to silica in a nanostructure containing the silica and a polymer having a polyethyleneimine skeleton or in a structural object obtained by removing the polymer from the nanostructure by calcining, and a process for producing the structural object.

Advantageous Effects of Invention

The structural object having a superhydrophobic surface of the present invention is obtained by forming a superhydrophobic nanostructure composite on a surface of a solid substrate such as a metal, glass, an inorganic metal oxide, a plastic, fibers, or paper having a desired shape. The structural object itself may have any form of a complex flat surface, curved surface, rod shape, tubular shape, and the like. In addition, superhydrophobicity can be partly or wholly exhibited in any of the inside of a tube, the outside of a tube, the inside of a container, and the outside of a container. Furthermore, since the superhydrophobic nanostructure composite to be coated includes, as a template, a polymer layer formed on a solid substrate by contact between a solution of a polymer having a polyethyleneimine skeleton and the substrate, it is easy to select only a part of the surface of the solid substrate and coat the part. In addition, since the superhydrophobic nanostructure composite on the surface of the solid substrate is basically composed of silica, the composite can be developed into a coating material having a high solvent resistance and corrosion resistance. Furthermore, it is easy to incorporate various functional parts such as metal ions and metal nanoparticles into the composite. In addition, the process for producing the structural object can be carried out with general-purpose equipment, and thus the structural object can be easily produced at a low cost. Accordingly, the structural object can be used in various devices that are used by combining various additional functions with superhydrophobicity. Specifically, the application of the structural object can be developed in a wide range of industrial fields such as the establishment of superhydrophobic coatings, superhydrophobic color-developing materials, superhydrophobic antibacterial coatings, catalyst-imparting microreactors, enzyme-immobilizing devices, separation/purification devices for substances, blood circulation devices, micro-flow paths, solution transportation/transfer devices, self-cleaning containers, nozzles for printing, chips, sensors, and various micro-batteries.

BRIEF DESCRIPTION OF DRAWINGS

(FIG. 2 includes photographs showing the change in the contact angle of a water droplet at each treatment time, and a graph showing the change in the contact angle with the hydrophobizing treatment time.)

(FIG. 4 includes photographs showing the change in the contact angle of a water droplet at each treatment time, and a graph showing the change in the contact angle with the hydrophobizing treatment time.)

DESCRIPTION OF EMBODIMENTS

Figure 1:
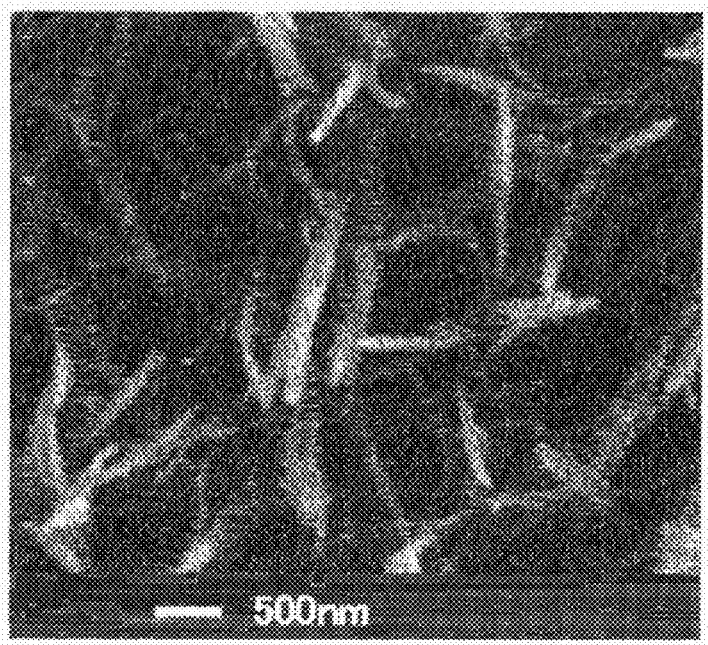
FIG. 1 is a scanning electron micrograph of a surface of a solid substrate before a hydrophobizing treatment, the solid substrate being obtained in Example 1.

The inventors of the present invention have already provided a silica-containing nanostructure having a complex shape and including a nanofiber as a basic unit. The nanofiber is obtained by hydrolytically condensing an alkoxysilane in a solution on a surface of a crystalline aggregate, which is obtained by growing a polymer having a linear polyethyleneimine skeleton in an aqueous medium in a self-assembling manner, to deposit silica using the crystalline aggregate as a reaction field (refer to Japanese Unexamined Patent Application Publication No. 2005-264421, Japanese Unexamined Patent Application Publication No. 2005-336440, Japanese Unexamined Patent Application Publication No. 2006-063097, and Japanese Unexamined Patent Application Publication No. 2007-051056).

The basic principle of this technology is to spontaneously grow a crystalline aggregate of a polyethyleneimine skeleton-containing polymer in a solution. Once the crystalline aggregate is formed, a silica source is then simply mixed in a dispersion of the crystalline aggregate so that silica is naturally deposited only on the surface of the crystalline aggregate (so-called sol-gel reaction). A silica-containing nanostructure obtained by this method basically includes a nanofiber as a unit for forming the structure. Since the shape of the entire structure is induced by the spatial arrangement of the units, the resultant structure includes a large number of gaps on the nanolevel and has a large surface area. It is believed that this method can be suitably used as an efficient process that satisfies the formation of a rough surface structure on the nanolevel.

It is believed that if the above-proposed growth of the crystalline aggregate of a polyethyleneimine skeleton-containing polymer in a solution can be performed on a surface of a solid substrate having a desired shape to form a layer of the crystalline aggregate of the polymer on the substrate, a nanostructure having a novel surface in which silica and the polymer are combined can be constructed on the solid substrate. In further extending this working model, it is believed that even when the layer to be formed on a solid substrate is not a crystalline aggregate of a polymer but a stable layer composed of a non-crystalline molecular aggregate of a polyethyleneimine skeleton-containing polymer, a novel nanosurface in which silica and the polymer are combined can be similarly constructed.

Accordingly, in order to achieve the above object, how a stable layer (coating film) of a self-assembled aggregate of a polyethyleneimine skeleton-containing polymer is formed on a surface of a solid substrate is a fundamental issue that needs to be dealt with. Important characteristics of polyethyleneimine skeleton-containing polymers are that they are basic and they have extremely high polarity. Therefore, polyethyleneimine skeleton-containing polymers have a strong interacting force (adsorption force) with various surfaces such as various electron acceptor substrates, Lewis acidic substrates, acidic substrates, polar substrates, and hydrogen-bonding substrates, namely, a metal substrate, a glass substrate, an inorganic metal oxide substrate, a plastic substrate having a polar surface, and a cellulose substrate. The inventors of the present invention found that, by bringing (immersing) a surface of a solid substrate having a desired shape into contact with (in) a molecular solution of a polyethyleneimine skeleton-containing polymer with a certain concentration and at a certain temperature utilizing these characteristics of the polyethyleneimine skeleton-containing polymer, the polymer in the solution is attracted to the surface of the solid substrate, and consequently, a layer composed of a molecular aggregate of the polymer can be easily formed over an entire portion of the surface of the solid substrate, the portion being brought into contact with the solution. Furthermore, when the solid substrate coated with a polymer layer thus obtained is immersed in a silica source solution, the solid substrate can be coated with a nanostructure in which silica and the polymer are combined and which has a complex structural object. By chemically bonding a silane having a hydrophobic group to a portion of silica of the nanostructure, a surface that exhibits superhydrophobicity is constructed on the solid substrate.

In the present invention, the term "nanostructure" refers to a structure composed of repeating units (units) of the nanometer order and having a certain shape. More specifically, the term "nanostructure (y1)" refers to a structure composed of a unit containing the above-mentioned polymer and silica as a main constituent component, and the term "nanostructure (y2)" refers to a structure composed of a unit containing silica as a main constituent component. Products obtained by performing a hydrophobizing treatment of these nanostructures (y1) and (y2) are superhydrophobic nanostructure composites (Z1) and (Z2), respectively.

A structural object having a superhydrophobic surface (hereinafter, abbreviated as "structural object") of the present invention is formed by coating a surface of a solid substrate (X) with the nanostructure (y1) containing silica (B) and a polymer (A) having a polyethyleneimine skeleton (a), or the nanostructure (y2) obtained by removing the polymer (A) from the nanostructure (y1) by calcining, and bonding a hydrophobic group to a silica portion of the surface of the structure. Furthermore, according to the structural object of the present invention, metal ions or metal nanoparticles may be incorporated in the nanostructure (y1). Accordingly, the structural object of the present invention includes a solid substrate, a polymer, silica, a hydrophobic group bonded to silica, metal ions, metal nanoparticles, etc. As described below, herein, the term "metal nanoparticles" refers to metal fine particles that are present on the nanometer order. The metal nanoparticles do not necessarily have a completely spherical shape, but are described as "particles" for convenience. The present invention will be described in detail below.

[Solid Substrate]

A solid substrate (X) used in the present invention is not particularly limited as long as a polymer (A) having a polyethyleneimine skeleton (a) described below can adsorb to the solid substrate (X). Examples of the solid substrate (X) that can be used include substrates composed of an inorganic material such as glass, a metal, or a metal oxide; and substrates composed of an organic material such as a resin (plastic), cellulose, fibers, or paper. Examples thereof further include substrates prepared by etching a surface of glass, a metal, or a metal oxide; and substrates prepared by performing a plasma treatment or an ozone treatment on a surface of a resin substrate.

The inorganic material glass substrate is not particularly limited. For example, glass such as heat-resistant glass (borosilicate glass), soda-lime glass, crystal glass, or lead- and arsenic-free optical-glass can be suitably used. When a glass substrate is used, a surface of the substrate may be etched with an alkali solution such as a sodium hydroxide solution, as required.

The inorganic material metal substrate is not particularly limited. For example, a substrate composed of iron, copper, aluminum, stainless steel, zinc, silver, gold, platinum, an alloy thereof, or the like can be suitably used.

The inorganic material metal oxide substrate is not particularly limited. For example, indium tin oxide (ITO), tin oxide, copper oxide, titanium oxide, zinc oxide, alumina, or the like can be suitably used.

Example of the resin substrate that can be used include processed products of various polymers such as polyethylene, polypropylene, polycarbonate, polyester, polystyrene, polymethacrylate, polyvinyl chloride, polyethylene alcohol, polyimide, polyamide, polyurethane, epoxy resin, and cellulose. When such polymers are used, a surface of the substrate may be treated with a plasma or ozone or treated with sulfuric acid, an alkali, or the like, as required.

The shape of the solid substrate (X) is not particularly limited, and the solid substrate (X) may be a flat plate, a curved plate, or a film. In particular, even a tube, spiral body of a tube, or microtube, which is a processed product having a complex shape; a container having a desired shape (for example, a spherical, rectangular, triangular, or cylindrical shape); a rod having a desired shape (for example, a columnar, rectangular, or triangular shape), or a fibrous solid substrate can be suitably used.

In the case where the polymer (A) is removed in a calcining step in a process for producing a structural object of the present invention described below, it is necessary to use a solid substrate that is not degraded at the calcining temperature.

Furthermore, in particular, when a tubular solid substrate is used and the inner surface thereof constitutes a superhydrophobic surface to form a tubular structural object, the minimum inner diameter of the substrate is 10 μm because it is necessary to form, on the inner surface, a superhydrophobic coating film described below. A tubular solid substrate having an inner diameter of 10 μm or more can be suitably used without particular limitation. As for a tubular structural object in the present invention, a tubular solid substrate having a uniform inner diameter need not be necessarily used. Furthermore, the tubular solid substrate of the present invention need not have a shape including two or more outlets/inlets of an aqueous solution. For example, the solid substrate may be a container, such as a flask or a beaker, for transferring an aqueous solution, the container being used for temporarily holding an aqueous solution and then transferring the aqueous solution to another container or the like,

[Polymer (A) Having Polyethyleneimine Skeleton (A)]

In the present invention, it is essential that a polymer (A) having a polyethyleneimine skeleton (a) be used as a polymer layer formed on the solid substrate (X). The polymer (A) having the polyethyleneimine skeleton (a) may be a linear-shaped, star-shaped, or comb-shaped homopolymer or copolymer having other repeating units. In a case of a copolymer, the molar ratio of the polyethyleneimine skeleton (a) in the polymer (A) is preferably 200 or more from the standpoint that a stable polymer layer can be formed, and a block copolymer in which the number of repeating units of the polyethyleneimine skeleton (a) is 10 or more is more preferable.

The polyethyleneimine skeleton (a) may be linear or branched. However, a linear polyethyleneimine skeleton, which has high crystalline aggregate formation ability, is more preferable. In both the case of a homopolymer and the case of a copolymer, the molecular weight corresponding to a polyethyleneimine skeleton portion is preferably in the range of 500 to 1,000,000 from the standpoint that a stable polymer layer can be formed on the substrate (X). The polymer (A) having the polyethyleneimine skeleton (a) can be obtained as a commercially available product or obtained by a synthesis method which has been disclosed by the inventors of the present invention (refer to the above patent literatures).

As described below, the polymer (A) can be dissolved in various solutions and used. In this case, in addition to the polymer (A) having the polyethyleneimine skeleton (a), other polymers that are compatible with the polymer (A) may be mixed and used. Examples of the other polymers include polyethylene glycol, polyvinyl alcohol, polyvinylpyrrolidone, polyacrylamide, poly(N-isopropylacrylamide), polyhydroxyethyl acrylate, polymethyloxazoline, polyethyloxazoline, and polypropyleneimine. By using these other polymers, the thickness of a nanostructure provided on the surface of the structural object to be prepared, and furthermore, the thickness of the superhydrophobic nanostructure composite can be easily adjusted.

[Silica (B)]

A significant feature of a surface of a substrate of a structural object obtained in the present invention lies in that the surface is coated with a nanostructure (y1) containing the polymer (A) and silica (B) as a main constituent component, or a nanostructure (y2) containing silica (B) as a main constituent component. As a silica source that is necessary for forming silica (B), for example, alkoxysilanes, water glass, ammonium hexafluorosilicate, or the like can be used. Note that the phrase "containing as a main constituent component" means that a component other than impurities in the raw materials and substances derived from a side reaction or the like is not contained as long as a third component is not intentionally mixed.

As the alkoxysilanes, tetramethoxysilane, an oligomer of a methoxysilane condensation product, tetraethoxysilane, or an oligomer of an ethoxysilane condensation product can be suitably used. Examples of the alkoxysilanes further include alkyl-substituted alkoxysilanes such as methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, and iso-propyltriethoxysilane. Examples thereof further include 3-chloropropyltrimethoxysilane, 3-chloropropyltriethoxysilane, vinyltrimethoxysilane, vinyltriethoxysilane, 3-glycidoxypropyltrimethoxysilane, 3-glycidoxypropyltriethoxysilane, 3-aminopropyltrimethoxysilane, 3-aminopropyltriethoxysilane, 3-mercaptopropyltrimethoxysilane, 3-mercaptotriethoxysilane, 3,3,3-trifluoropropyltrimethoxysilane, 3,3,3-trifluoropropyltriethoxysilane, 3-methacryloxypropyltrimethoxysilane, 3-methacryloxypropyltriethoxysilane, phenyltrimethoxysilane, phenyltriethoxysilane, p-chloromethylphenyltrimethoxysilane, p-chloromethylphenyltriethoxysilane, dimethyldimethoxysilane, dimethyldiethoxysilane, diethyldimethoxysilane, and diethyldiethoxysilane. These compounds may be used alone or as a mixture.

Furthermore, other alkoxy metal compounds may be mixed with the silica source and used. Examples of the compounds that can be used include tetrabutoxy titanium, tetraisopropoxy titanium, an aqueous solution of titanium bis(ammonium lactate)dihydroxide, which is stable in an aqueous medium, an aqueous solution of titanium bis(lactate), a propanol/water mixed solution of titanium bis(lactate), titanium (ethylacetoacetate)diisopropoxide, titanium sulfate, and ammonium hexafluorotitanate.

[Metal Ion]

The surface of the substrate in the structural object of the present invention is coated with the above-described nanostructure. Metal ions can be stably incorporated in the nanostructure (y1). Accordingly, a structural object coated with a superhydrophobic nanostructure composite containing the metal ions can be obtained.

Since the polyethyleneimine skeleton (a) in the polymer (A) has strong coordination ability to a metal ion, the metal ion is coordinately bonded to an ethyleneimine unit in the skeleton to form a metal ion complex. The metal ion complex is obtained by coordination of the metal ion to the ethyleneimine unit. Therefore, unlike a process of the formation of an ionic bond or the like, regardless of whether the metal ion is a cation or an anion, a complex can be formed by coordination of the metal ion to an ethyleneimine unit. Accordingly, the type of metal of the metal ion is not limited as long as the metal ion can be coordinately bonded to an ethyleneimine unit in the polymer (A). The metal may be an alkali metal, an alkaline earth metal, a transition metal, a semimetal, a lanthanum-based metal, a metal compound such as a polyoxometalate, or the like. One type of metal ion may be used, or plurality types of metal ions may be mixed.

Examples of the alkali metal include Li, Na, K, and Cs. Examples of a counteranion of the ion of the alkali metal include Cl, Br, I, $NO_3$, $SO_4$, $PO_4$, $ClO_4$, $PF_6$, $BF_4$, and $F_3CSO_3$.

Examples of the alkaline earth metal include Mg, Ba, and Ca.

A metal ion of a transition metal can be suitably used, even when the metal ion is a transition metal cation ($M^{n+}$) or the transition metal forms an acid radical anion ($MO_x^{n-}$) bonded to oxygen or an anion ($ML_x^{n-}$) bonded to a halogen. It should be noted that the term "transition metal" in this description refers to Sc and Y in group 3 of the periodic table and transition metal elements present in the fourth period to the sixth period in groups 4 to 12.

Examples of the transition metal cation include various types of transition metal cations ($M^{n+}$), e.g., monovalent, divalent, trivalent, or tetravalent cations of Ti, V, Cr, Mn, Fe, Co, Ni, Cu, Zn, Y, Zr, Mo, Ru, Rh, Pd, Ag, Cd, W, Os, Ir, Pt, Au, or Hg. A counteranion of these metal cations may be any of Cl, $NO_3$, $SO_4$, a polyoxometalate anion, and an organic anion of carboxylic acids. When the cations are those of, for example, Ag, Au, or Pt, which are easily reduced by an ethyleneimine skeleton, it is preferable that an ion complex be prepared by suppressing the reduction reaction, for example, by adjusting the pH to an acidic condition.

Examples of the transition metal anion include various types of transition metal anions ($MO_x^{n-}$), e.g., anions of $MnO_4$, $MoO_4$, $ReO_4$, $WO_3$, $RuO_4$, $CoO_4$, $CrO_4$, $VO_3$, $NiO_4$, and $UO_2$.

The metal ions in the present invention may be a form of a metal compound of polyoxometalates in which the above-mentioned transition metal anion is immobilized in silica (B) via metal cations that are coordinated to the ethyleneimine units in the polymer (A). Specific examples of the polyoxometalates include molybdates, tungstates, and vanadates combined with transition metal cations.

Furthermore, an anion ($ML_x^{n-}$) including various types of metals, for example, an anion in which a metal is coordinated to a halogen, such as $AuCl_4$, $PtCl_6$, $RhCl_4$, $ReF_6$, $NiF_6$, $CuF_6$, $RuCl_6$, or $In_2Cl_6$ can also be preferably used for forming an ion complex.

Examples of the semimetal ion include ions of Al, Ga, In, Tl, Ge, Sn, Pb, Sb, and Bi. Among these ions, ions of Al, Ga, In, Sn, Pb, and Tl are preferable.

Examples of the lanthanum-based metal ions include trivalent cations of La, Eu, Gd, Yb, and the like.

[Metal Nanoparticles]

As described above, in the present invention, metal ions can be incorporated in the nanostructure in the structural object. Accordingly, among these metal ions, metal ions that are easily reduced by a reduction reaction may be converted into metal nanoparticles, whereby the metal nanoparticles can be incorporated in the nanostructure (y1).

Examples of the type of metal of the metal nanoparticles include copper, silver, gold, platinum, palladium, manganese, nickel, rhodium, cobalt, ruthenium, rhenium, molybdenum, and iron. The metal nanoparticles in the nanostructure (y1) may be one type or two or more types of metal nanoparticles. Among these types of metals, silver, gold, platinum, and palladium are particularly preferable because metal ions thereof are spontaneously reduced at room temperature or in a heating state after the metal ions are coordinated to ethyleneimine units.

The size of the metal nanoparticles in the nanostructure (y1) can be controlled to be in the range of 1 to 20 nm. The metal nanoparticles can be immobilized inside or on the outer surface of the nanostructure (y1) containing the polymer (A) and silica (B).

[Organic Coloring Matter Molecule]

In the present invention, the polyethyleneimine skeleton (a) in the nanostructure (y1) that coats a structural object can form a physical bond structure with a compound having an amino group, a hydroxy group, a carboxylic acid group, a sulfonic acid group, or a phosphate group via a hydrogen bond and/or electrostatic attraction. Accordingly, for example, organic coloring matter molecules having any of these functional groups can be incorporated in the nanostructure (y1).

As the organic coloring matter molecules, a monofunctional acidic compound or a bifunctional or higher-functional polyfunctional acidic compound can be preferably used.

Specific examples thereof include aromatic acids such as tetraphenylporphyrin tetracarboxylic acid and pyrenedicarboxylic acid; aromatic or aliphatic sulfonic acids such as naphthalenedisulfonic acid, pyrenedisulfonic acid, pyrenetetrasulfonic acid, anthraquinonedisulfonic acid, tetraphenylporphyrin tetrasulfonic acid, phthalocyanine tetrasulfonic acid, and piperazine diethane sulfonic acid (PIPES); and azo dyes such as acid yellow, acid blue, acid red, direct blue, direct yellow, and direct red. In addition, coloring matters having a xanthene skeleton, for example, rhodamine, erythrosine, and eosine can also be used.

[Nanostructure (y1) Containing Polymer (A) and Silica (B)]

The nanostructure (y1) containing the polymer (A) and silica (B) is basically a composite silica nanofiber having a structure in which the polymer (A) is coated with silica (B). With a change in the spatial arrangement of the composite silica nanofibers on a surface of a substrate, the nanofibers constitute a state in which the entire surface of the substrate is coated, thus forming various patterns or morphologies. A wide variety of hierarchic structure can be formed. Examples thereof include a grass state (nano-grass) in which nanofibers are grown over the entire surface of a solid substrate so that a long axis of the fibers is mainly oriented in the vertical direction, a rice field state (nano-rice-field) in which the long axis of the nanofibers is somewhat slanted with respect to the vertical direction, a straw mat state (nano-straw-mat) in which nanofibers are horizontally laid over the entire surface of a substrate, and a sponge state (nano-sponge) in which nanofibers form a network over the entire surface of a substrate to form a net-like structure. In the present invention, the phrase "a long axis of nanofibers is oriented in a direction substantially perpendicular to the surface of a solid substrate" generically refers to the spatial arrangements of the above-described nano-grass state and the nano-rice-field state.

The diameter of the composite nanofiber of the basic unit in higher-order structures such as the above-described nano-grass state, nano-rice-field state, nano-straw-mat state, and nano-sponge state is in the range of 10 to 200 nm. The length of the nanofiber (in the long axis direction) in the nano-grass state and the nano-rice-field state can be controlled to be in the range of 50 nm to 2 μm.

The thickness of the coating on a solid substrate can be varied in the range of about 50 nm to 20 μm, though the thickness relates to the spatial arrangement state of the nanofibers. The nano-grass state is characterized in that the nanofibers significantly tend to grow directly upward, the length of the fibers basically constitutes the thickness, and the lengths of the respective fibers are substantially the same. In the nano-rice-field state, the nanofibers significantly tend to grow in a slanted manner, and thus the thickness of the coating film is smaller than the length of the fibers. The thickness of a layer in the nano-rice-field state is characterized in that the thickness is determined by the overlapping state of the slanted nanofibers. The thickness of a layer in the nano-sponge state is characterized in that the thickness is determined by the degree of protrusion caused by complex and regular entanglement of the nanofibers. When a network is formed, the thickness is determined by the overlapping state of the nanofibers and the like.

The content of the polymer (A) component in the nanostructure (y1) can be adjusted to 5 to 30 mass percent. By changing the content of the polymer (A) component, the spatial arrangement structural object (higher-order structure) can also be changed.

Furthermore, in the case where metal ions, metal nanoparticles, or organic coloring matter molecules are incorporated in the nanostructure (y1), the higher-order structure can also be controlled by changing the type of these components. In such a case, the basic unit is also the nanofiber described above, and these nanofibers are combined to form a complex shape.

In incorporation of the metal ions, the amount of metal ions incorporated is preferably adjusted to be in the range of ¼ to ¹⁄₂₀₀ equivalents relative to 1 equivalent of the ethyleneimine unit in the polymer (A). By changing this ratio, the thickness of a coating layer composed of the nanostructure can be changed. In addition, the coating layer obtained in this case may develop a color in accordance with the type of metal used.

In incorporation of the metal nanoparticles, the amount of metal nanoparticles incorporated is preferably adjusted to be in the range of ¼ to ¹⁄₂₀₀ equivalents relative to 1 equivalent of the ethyleneimine unit in the polymer (A). By changing this ratio, the thickness of a coating layer composed of the nanostructure can be changed. In addition, the coating layer obtained in this case may develop a color in accordance with the type of metal used.

In incorporation of the organic coloring matter molecules, the amount of organic coloring matter molecules incorporated is preferably adjusted to be in the range of ½ to ¹⁄₂₀₀ equivalents relative to 1 equivalent of the ethyleneimine unit in the polymer (A). By changing this ratio, the thickness and the shape pattern of the coating layer composed of the nanostructure can also be changed.

Furthermore, two or more types of a metal ion, a metal nanoparticle, an organic coloring matter molecule, and the like can be incorporated in the nanostructure (y1).

[Nanostructure (y2) Containing Silica (B) as Main Constituent Component]

By calcining the whole solid substrate (X) including the above-prepared nanostructure (y1) containing the polymer (A) and silica (B), it is possible to obtain a solid substrate (X) coated with a nanostructure (y2) from which the polymer (A) has been removed and which contains silica (B) as a main constituent component. In this case, although the polymer (A) is removed by the calcining, silica (B) maintains the structure thereof. Thus, the shape of the nanostructure (y2) is also determined by the spatial arrangement of the nanostructure (y1). Specifically, a wide variety of hierarchic structures are formed. Examples thereof include a grass state (nano-grass) in which nanofibers are grown over the entire surface of a solid substrate so that a long axis of the fibers is mainly oriented in the vertical direction, a rice field state (nano-rice-field) in which the long axis of the nanofibers is somewhat slanted with respect to the vertical direction, a straw mat state (nano-straw-mat) in which nanofibers are horizontally laid over the entire surface of a substrate, and a sponge state (nano-sponge) in which nanofibers form a network over the entire surface of a substrate.

[Hydrophobizing Treatment]

In the present invention, to form a superhydrophobic surface, the surface of the nanostructure (y1) or the nanostructure (y2) must be modified with a hydrophobic group. This modification can be easily conducted by contacting a compound having a hydrophobic group.

Examples of the hydrophobic group include alkyl groups having 1 to 22 carbon atoms, aromatic groups which may have a substituent (wherein the substituent is a hydrophobic group such as an alkyl group, fluorinated alkyl group, or partially fluorinated alkyl group having 1 to 22 carbon atoms), fluorinated alkyl groups having 1 to 22 carbon atoms, and partially fluorinated alkyl groups having 1 to 22 carbon atoms.

In order to efficiently modify silica (B) of the nanostructure (y1) or the nanostructure (y2) with the hydrophobic group, preferably, silane coupling agents having the hydrophobic group is used alone or as a mixture.

Examples of the silane coupling agents include alkyltrimethoxysilanes and alkyltrichlorosilanes in which the number of carbon atoms of the alkyl group is 1 to 22, such as methyltrimethoxysilane, dimethyldimethoxysilane, ethyltrimethoxysilane, ethyltriethoxysilane, n-propyltrimethoxysilane, n-propyltriethoxysilane, iso-propyltrimethoxysilane, iso-propyltriethoxysilane, pentyltrimethoxysilane, and hexyltrimethoxysilane.

As a silane coupling agent having a fluorine atom, which is effective to reduce the surface tension, a silane coupling agent having a (partially) fluorinated alkyl group, for example, 3,3,3-trifluoropropyltrimethoxysilane or (tridecafluoro-1,1,2,2-tetrahydrooctyl)trichlorosilane can also be used.

Examples of a silane coupling agent having an aromatic group include phenyltrimethoxysilane, phenyltriethoxysilane, p-chloromethylphenyltrimethoxysilane, and p-chloromethylphenyltriethoxysilane.

Alternatively, instead of the above-described introduction of a hydrophobic group via a chemical bond, the hydrophobic group can be introduced by physically adsorbing a water-insoluble polyacrylate polymer, polyamide polymer, long-chain alkylamine compound having an alkyl group having 1 to 22 carbon atoms, or the like to the nanofibers.

[Process for Producing Structural Object Having Superhydrophobic Surface]

A process for producing a structural object of the present invention basically includes step (1) of immersing a solid substrate (X) in a solution of a polymer (A) having a polyethyleneimine skeleton (a), a mixed solution of a metal ion and a polymer (A) having a polyethyleneimine skeleton (a), or a mixed solution of an organic coloring matter molecule or the like and a polymer (A) having a polyethyleneimine skeleton (a), and then taking out the substrate (X) to prepare a substrate in which a polymer layer composed of the polymer (A) having the polyethyleneimine skeleton (a) and the metal ion, the organic coloring matter molecule, or the like, which is used in combination, is formed on the surface of the substrate (X);

step (2) of immersing the substrate having the polymer layer thereon into a silica source solution (B') to deposit silica (B) on the surface of the polymer layer by a catalytic function of the polyethyleneimine skeleton (a) in the polymer layer adsorbed on the surface of the substrate, thus forming a nanostructure (y1) and coating the substrate with the nanostructure (y1); and step (3) of treating the surface of the nanostructure (y1) obtained in step (2) with a solution containing a silane coupling agent to introduce the hydrophobic group into the surface of the nanostructure. Through these steps, a structural object having a superhydrophobic surface in which polyethyleneimine is contained in a surface composition can be produced.

Furthermore, in a process for producing a structural object of the present invention, by providing a step of removing the polymer (A) having the polyethyleneimine skeleton (a) from the nanostructure (y1) by calcining, the step including calcining, under heating, the solid substrate (X) coated with the nanostructure (y1) obtained through steps (1) and (2), it is possible to produce a structural object having a superhydrophobic surface in which polyethyleneimine is not contained in a surface composition.

As the polymer (A) having the polyethyleneimine skeleton (a) used in step (1), the above-described polymers can be used. A solvent that can be used when the solution of the polymer (A) is prepared is not particularly limited as long as the polymer (A) is dissolved in the solvent. For example, water, an organic solvent such as methanol or ethanol, or a mixed solvent of these can be appropriately used.

The concentration of the polymer (A) in the solution is not limited as long as a polymer layer can be formed on the solid substrate (X). When a desired pattern is formed or when the density of the polymer adsorbed to the surface of the substrate is increased, the concentration is preferably in the range of 0.5 to 50 mass percent, and more preferably in the range of 5 to 50 mass percent.

The above-mentioned other polymers that are soluble in the solvent and compatible with the polymer (A) can be mixed in the solution of the polymer (A) having the polyethyleneimine skeleton (a). The amount of the other polymer mixed may be either higher or lower than the concentration of the polymer (A) having the polyethyleneimine skeleton (a).

When a coating layer composed of a nanostructure (y1) containing a metal ion is formed, the metal ion is mixed in the solution of the polymer (A) having the polyethyleneimine skeleton (a). The concentration of the metal ion is preferably adjusted to be ¼ equivalents or less of the ethyleneimine unit in the polyethyleneimine skeleton (a).

When a coating layer composed of a nanostructure (y1) containing an organic coloring matter molecule or the like is formed, the organic coloring matter molecule or the like is mixed in the solution of the polymer (A) having the polyethyleneimine skeleton (a). The concentration of the organic coloring matter molecule or the like is preferably adjusted to be ½ equivalents or less of the ethyleneimine unit in the polyethyleneimine skeleton (a).

To prepare a polymer layer in step (1), the solid substrate (X) is immersed with a solution of the polymer (A). As for the immersion method, a desired solid substrate (X) is preferably immersed in a solution of the polymer (A).

In the immersion method, the substrate can be brought into contact with the solution by immersing the substrate (non-container) into the solution or filling the substrate (container) with the solution depending on the shape of the substrate. During the immersion, the temperature of the solution of the polymer (A) is preferably in a heated state, and preferably a temperature in the range of about 50° C. to 90° C. The time during which the solid substrate (X) is brought into contact with the solution of the polymer (A) is not particularly limited. The time is preferably selected in the range of several seconds to one hour depending on the material of the substrate (X). When the material of the substrate has a strong binding ability with polyethyleneimine, for example, in the case of glass, a metal, or the like, it is sufficient that the time is several seconds to several minutes. When the material of the substrate has a weak binding ability with polyethyleneimine, the time may be several tens of minutes to one hour.

After the contact between the solid substrate (X) and the solution of the polymer (A), when the substrate is taken from the solution of the polymer (A) and left to stand at room temperature (about 25° C.), an aggregate layer of the polymer (A) is spontaneously formed on the surface of the substrate (X). Alternatively, an aggregate layer of the polymer (A) may be spontaneously formed by immersing the substrate (X) in distilled water at 4° C. to 30° C. or in an aqueous ammonia solution at room temperature to a subfreezing temperature immediately after the substrate (X) is taken from the solution of the polymer (A).

As the method for immersing the surface of the solid substrate (X) with the solution of the polymer (A), for example, besides application with a spin coater, a bar coater, an applicator, or the like, methods such as a print using a jet printer, or printing can also be employed. In particular, when the contact is performed so as to form a fine pattern, the method using a jet printer is preferable.

In step (2), the polymer layer formed by way of step (1) is immersing with a silica source solution (B') to deposit silica (B) on the surface of the polymer layer, thus forming a nanostructure (y1) containing the polymer (A) and silica (B). Even when a metal ion or an organic coloring matter molecule or the like is contained in the polymer layer, silica (B) can be precipitated by a similar method to form a target nanostructure (y1).

As the silica source solution (B') used in this step, the above-mentioned aqueous solution of various silica sources; an alcohol solvent, e.g., aqueous organic solvent solution such as methanol, ethanol, or propanol; or a mixed solvent solution of any of these and water can be used. An aqueous water-glass solution whose pH is adjusted to be in the range of 9 to 11 can also be used. A metal alkoxide other than silica may be mixed with the silica source solution (B') used.

In addition, alkoxysilane compounds used as a silica source can also be used in the form of a bulk liquid that contains no solvent.

As a method for immersing the solid substrate having the polymer layer thereon with the silica source solution (B'), an immersion method can be preferably employed. Five to sixty minutes are enough for the immersion, but the time may be further extended, as required. The temperature of the silica source solution (B') may be room temperature or in a heated state. In the case of heating, in order to regularly deposit silica (B) on the surface of the solid substrate (X), the temperature is preferably set to be 70° C. or lower.

The structure of the nanostructure (y1) containing silica (B) to be deposited and the polymer (A) can be adjusted by selecting the type, the concentration, and the like of the silica source. It is preferable to appropriately select the type and the concentration of the silica source according to the purpose.

Polyethyleneimine can reduce noble metal ions, such as ions of gold, platinum, silver, and palladium to metal nanoparticles. Accordingly, by performing a step of immersing the structural object coated with the nanostructure (y1), which is obtained in the above steps, with an aqueous solution of such a noble metal ion, the noble metal ion can be converted into metal nanoparticles in the nanostructure (y1). Thus, a nanostructure including the metal nanoparticles can be obtained.

As a method for immersing the structural object with the aqueous solution of the noble metal ion, an immersion method can be preferably employed. As the aqueous solution of the noble metal ion, an aqueous solution of chloroauric acid, sodium chloroaurate, chloroplatinic acid, sodium chloroplatinate, silver nitrate, or the like can be preferably used. The concentration of the aqueous solution of the noble metal ion is preferably 0.1 to 5 mole percent.

The temperature of the aqueous solution of the noble metal ion is not particularly limited, and may be in the range of room temperature to 90° C. In order to accelerate the reduction reaction, an aqueous solution heated at 50° C. to 90° C. is preferably used. The time during which the structure is immersed in the aqueous solution of the metal ion may be 0.5 to 3 hours. When the structure is immersed in a heated aqueous solution, about 30 minutes is enough.

In the case of a metal ion that is not readily reduced by polyethyleneimine alone, a metal ion in the above-prepared structure containing the metal ion may be reduced by combining a step of immersing the metal ion with a reducing agent, in particular, a solution of a low-molecular-weight reducing agent or hydrogen gas. Thus, a nanostructure containing nanoparticles of the metal can be obtained.

Examples of the reducing agent that can be used in this case include ascorbic acid, aldehydes, hydrazine, sodium borohydride, ammonium borohydride, and hydrogen. When a metal ion is reduced using the reducing agent, the reaction can be conducted in an aqueous medium, and it is possible to employ a method in which a structural object containing the metal ion is immersed in a solution of the reducing agent or a method in which such a structure is left to stand in a hydrogen gas atmosphere. In this case, the temperature of the aqueous solution of the reducing agent is in the range of room temperature to 90° C., and the concentration of the reducing agent is preferably 1 to 5 mole percent.

The type of metal of a metal ion that can be adapted here is not particularly limited. From the standpoint that the reduction reaction rapidly proceeds, the metal is preferably copper, manganese, chromium, nickel, tin, vanadium, or palladium.

When the polymer (A) in the nanostructure (y1) is removed by calcining under heating to form the nanostructure (y2), the calcining temperature can be set to be 300° C. to 600° C. In the case where this step is performed, the solid substrate (X) is selected from heat-resistant inorganic materials such as glass, metal oxides, and metals.

The calcining time is desirably in the range of 1 to 7 hours. However, for example, at a high temperature, the calcining may be performed in a short time, whereas at a low temperature, the calcining time may be extended. Thus, the calcining time is preferably adjusted according to need.

Through a step of immersing the above-prepared solid substrate (X) coated with the nanostructure (y1) or the nanostructure (y2) with the above-described silane coupling agent having a hydrophobic group, the surface is converted so as to have superhydrophobicity.

In this case, the silane coupling agent having the hydrophobic group may be dissolved in a solvent such as chloroform, methylene chloride, cyclohexanone, xylene, toluene, ethanol, or methanol and used. These solvents may be used alone or as a mixture. The concentration of the silane coupling agent is preferably adjusted to be 1 to 5 weight percent.

Furthermore, the above solution is preferably used as a mixture with a 1 to 5 weight percent ethanol solution of aqueous ammonia. As for the volume ratio in the mixing, the ethanol solution of aqueous ammonia is preferably in the range of 5 to 10 equivalents relative to 1 equivalent of the silane coupling agent solution.

The contact with the silane coupling agent is preferably performed by a method in which the solid substrate (X) is immersed in the mixed solution prepared above. An alkylsilane of the silane coupling agent is introduced into a portion of silica (B) in the nanostructure (y1) or the nanostructure (y2) with a Si—O—Si bond, thus converting into a structure having a final superhydrophobic nanosurface.

The time during which the solid substrate (X) is immersed in the solution is in the range of one hour to three days. It is preferable to appropriately select the time in accordance with the concentration of the silane coupling agent and the concentration of ammonia in the solution and the like. As the immersion time is prolonged in a solution having a certain concentration, the contact angle can be gradually increased. After a certain time passed, the contact angle becomes close to the maximum value of 180°. At the time when this value appears, it can be assumed that the introduction of the hydrophobic residue into the surface is in a saturated state. The immersion time can be selected in accordance with the level of the desired hydrophobicity.

[Application Method of Structural Object Having Superhydrophobic Surface]

A method of using the structural object having a superhydrophobic surface of the present invention obtained by the above production process is not particularly limited. In particular, a tubular solid substrate having a superhydrophobic inner surface can be suitably used as an instrument for transferring an aqueous solution.

The above tubular structural object is significantly characterized in that, in a state in which an aqueous solution is allowed to flow on the inner wall, the aqueous solution does not remain on the inner wall, and the structural object does not require washing after use. The aqueous solution is not particularly limited as long as the aqueous solution can be diluted with water. An aqueous solution containing a water-soluble inorganic compound, in particular, metal ions can be suitably used.

In addition, an aqueous solution containing a water-soluble organic coloring matter, a water-soluble amino acid, a water-soluble sugar, a water-soluble vitamin, a water-soluble protein, DNA, a water-soluble medicine, or the like can also be used as the aqueous solution. Furthermore, an aqueous solution containing a water-soluble organic compound, for example, an alcohol compound having a hydroxyl group, an organic acid compound having a carboxylic acid group, an amine compound having an amino group, or an amide compound can also be suitably used.

EXAMPLES

The present invention will now be described in more detail by way of Examples. It should be noted that "%" represents "mass percent" unless otherwise stated.
[Shape Analysis of Nanostructure with Scanning Electron Microscope (SEM)]
An isolated dry nanostructure was fixed to a sample supporting table with a double-sided tape and observed with a surface observation device VE-9800 produced by Keyence Corporation.
[Measurement of Contact Angle]
The contact angle was measured with an automatic contact angle meter Contact Angle System OCA (produced by Dataphysics Instruments GmbH).
[Measurement of Contact Angle of Water Droplet on Inner Surface of Tube]
The contact angle of water on an inner-wall surface of a tubular substrate was measured from an image of a high-speed camera (MotionPro X4, produced by Integrated Design Tools, Inc.), the image being acquired when a water droplet was transferred in the tube.

Synthesis Example 1

Synthesis of Linear Polyethyleneimine (L-PEI)

Three grams of commercially available polyethyloxazoline (number-average molecular weight 50,000, average degree of polymerization 5,000, produced by Aldrich) was dissolved in 15 mL of hydrochloric acid with a concentration of 5 mole/L. The resultant solution was heated to 90° C. in an oil bath and stirred at the temperature for 10 hours. Next, 50 mL of acetone was added to the reaction solution to completely precipitate the resultant polymer. The polymer was filtered, and then washed with methanol three times to obtain a white polyethyleneimine powder. The prepared powder was identified with $^1$H-NMR (deuterium oxide, AL300, produced by JEOL Ltd., 300 MHz). According to the result, it was confirmed that peaks at 1.2 ppm ($CH_3$) and 2.3 ppm ($CH_2$) attributable to a side-chain ethyl group of polyethyloxazoline completely disappeared. That is, it was confirmed that polyethyloxazoline was completely hydrolyzed and converted into polyethyleneimine.

The powder was dissolved in 5 mL of distilled water, and 50 mL of 15% aqueous ammonia was added dropwise to the solution under stirring. After the mixed liquid was left to stand for one night, the precipitated polymer aggregate powder was filtered, and the polymer aggregate powder was washed with cold water three times. The crystal powder after washing was dried in a desiccator at room temperature to obtain linear polyethyleneimine (L-PEI). The yield was 2.2 g (containing water of crystallization). In polyethyleneimine obtained by hydrolysis of polyoxazoline, only the side chain reacts, and the main chain does not change. Accordingly, the degree of polymerization of L-PEI is 5,000, which is the same as that before the hydrolysis.

Synthesis Example 2

Synthesis of Benzene-Ring-Centered Star-Shaped Polyethyleneimine (B-PEI)

Star-shaped polymethyloxazoline in which six polymethyloxazoline arms are bonded to the center of a benzene ring, the star-shaped polymethyloxazoline serving as a precursor polymer, was synthesized as follows in accordance with the method disclosed in Jin, J. Mater. Chem., 13, 672-675 (2003).

To a ground-glass test tube in which a magnetic stirrer was set, 0.021 g (0.033 mmol) of hexakis(bromomethyl)benzene was charged as a polymerization initiator. After a three-way cock was attached to the opening of the test tube, the atmosphere in the tube was evacuated into a vacuum state and then replaced with nitrogen. In a nitrogen stream, 2.0 mL (24 mmol) of 2-methyl-2-oxazoline and 4.0 mL of N,N-dimethylacetamide were sequentially added to the test tube from an inlet of the three-way cock using a syringe. The test tube was heated on an oil bath to 60° C. and maintained for 30 minutes. As a result, the mixed solution became transparent. The transparent mixed solution was further heated to 100° C. and stirred at the temperature for 20 hours to obtain a precursor polymer. According to the result of $^1$H-NMR measurement of this mixed solution, the conversion rate of the monomer was 98 mole percent, and the yield was 1.8 g. The average degree of polymerization of the polymer was estimated on the basis of this conversion rate. The average degree of polymerization of each arm was 115. According to the measurement result of the molecular weight by gel permeation chromatography (GPC), the mass-average molecular weight of the polymer was 22,700, and the molecular-weight distribution was 1.6.

Polymethyloxazoline was hydrolyzed using this precursor polymer by the same method as that used in Synthesis Example 1 to obtain star-shaped polyethyleneimine B-PEI in which six polyethyleneimine arms are bonded to a benzene ring core. According to the measurement result of $^1$H-NMR (TMS external standard, in deuterium oxide), it was confirmed that a peak at 1.98 ppm attributable to a side-chain methyl of the precursor polymer before the hydrolysis completely disappeared.

The powder was dissolved in 5 mL of distilled water, and 50 mL of 15% aqueous ammonia was added dropwise to the solution under stirring. After the mixed liquid was left to stand for one night, the precipitated crystal powder was filtered, and the crystal powder was washed with cold water three times. The crystal powder after washing was dried in a desiccator at room temperature (25° C.) to obtain star-shaped polyethyleneimine (B-PEI) in which six polyethyleneimine arms are bonded to a benzene ring core. The yield was 1.3 g (containing water of crystallization).

Example 1

Glass Plate Structural Object Having Superhydrophobic Surface

A soda-lime glass plate having a size of 3×2 cm was immersed in a 4% aqueous solution of the L-PEI prepared above (solution at 80° C.) and left to stand for 30 seconds. The plate was taken out and left to stand at room temperature for five minutes. Subsequently, the plate was immersed in a mixed solution of a silica source (MS51*/distilled water/

IPA=0.5/3/3 volume ratio) at room temperature for 20 minutes. The plate was taken from the solution. The surface of the plate was washed with ethanol, and the plate was dried at room temperature. According to the result of SEM observation of the surface of the prepared plate, it was confirmed that the entire surface of the plate was coated with a nano-grass including a nanofiber as a basic unit (FIG. 1).

Figure 2:
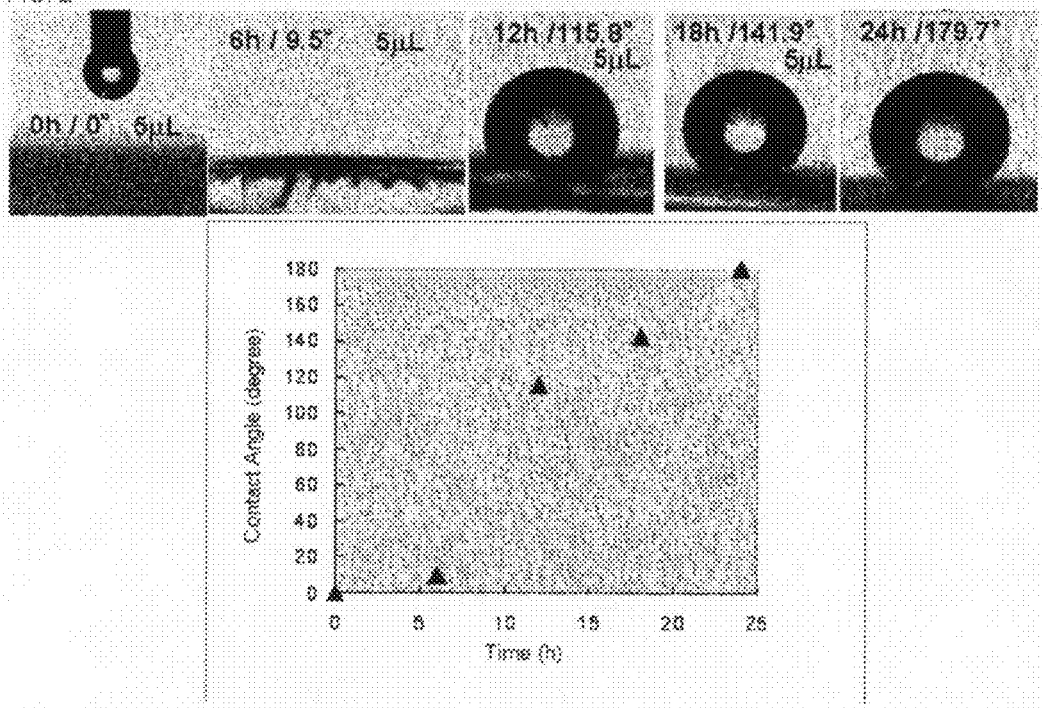
FIG. 2 shows the change in the contact angle with the hydrophobizing treatment time in Example 1.

Meanwhile, 3 mL of a chloroform solution of decyltrimethoxysilane (DTMS) with a concentration of 20% was prepared. The solution was mixed with 30 mL of ethanol, and 0.6 mL of aqueous ammonia (concentration 28%) was then added to the solution to prepare a mixed solution. The glass plate prepared above was immersed in the mixed solution at room temperature for a certain time, and was then taken out. The surface of the glass plate was washed with ethanol, and the plate was then dried while nitrogen gas was supplied. The water contact angle of the structural object thus obtained was measured. FIG. 2 shows the change in the contact angle with the immersion time of this hydrophobizing treatment. The illustrations in FIG. 2 are photographs of the water droplet contact angle at each time.

*MS51: Tetramer of tetramethoxysilane (produced by Colcoat Co., Ltd.)

Example 2

Glass Plate Structural Object Having Superhydrophobic Surface

Figure 3:
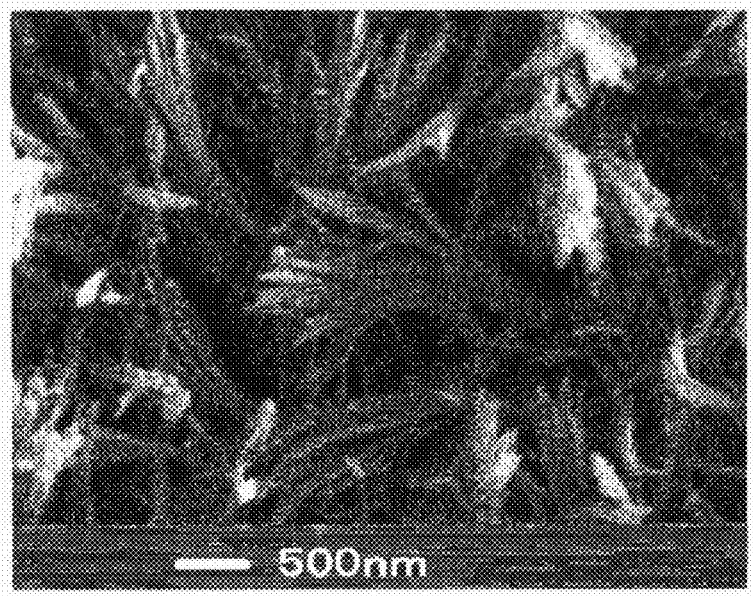
FIG. 3 is a scanning electron micrograph before a hydrophobizing treatment, the micrograph being obtained in Example 2.
Figure 4:
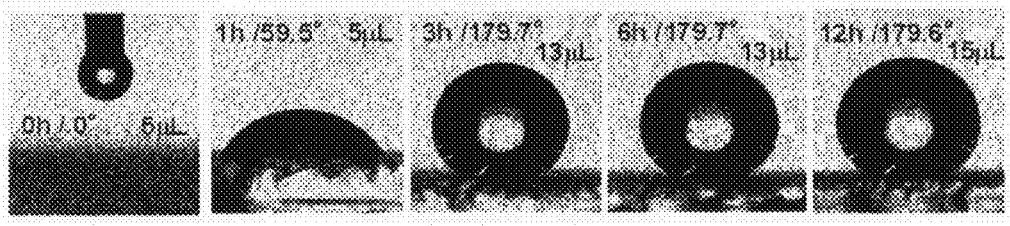
FIG. 4 shows the change in the contact angle with the hydrophobizing treatment time in Example 2.
Figure 4:
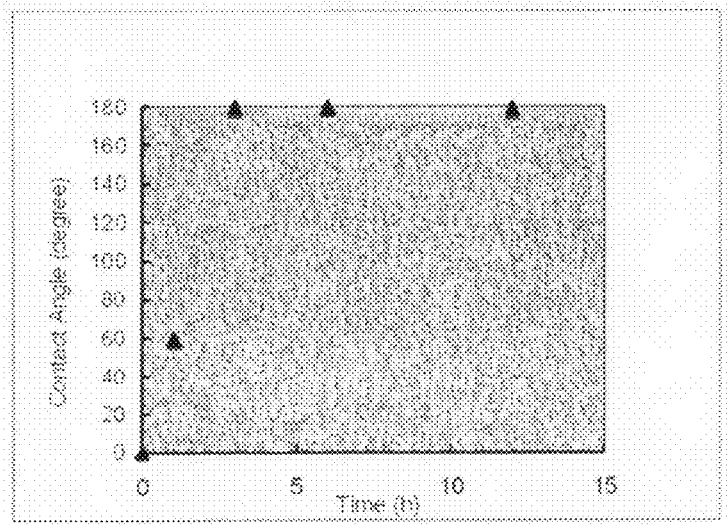

The glass plate shown in FIG. 1 and obtained by the route of Example 1 was calcined at 500° C. for two hours to remove the polymer inside (FIG. 3), and the glass plate was then immersed in a decyltrimethoxysilane (DTMS) solution for a certain time by the same method as that used in Example 1. Subsequently, the contact angle at each time was measured. FIG. 4 shows the results. It was suggested that, superhydrophobization in Example 2, which was performed after the removal of the polymer having the polyethyleneimine skeleton from the nano-grass, proceeded easily, as compared with the results in Example 1.

Example 3

Glass Plate Structural Object Having Superhydrophobic Surface that Exhibits Superhydrophobicity in Water for a Long Time A structural object obtained by immersing for three hours in the step of the hydrophobizing treatment described in the method of Example 2 was immersed in tap water for a certain time and then taken out to measure the contact angle. Table 1 shows the contact angle measured after the structural object was immersed in tap water. The contact angle did not change even after one month, and the superhydrophobicity was maintained. This result strongly suggests that this structural object can maintain a water-repellent property for a long period of time even in water. That is, this structural object has semi-permanent superhydrophobicity.

TABLE 1

Evaluation results of hydrophobicity of glass plate having superhydrophobic surface previously immersed in water

| The number of days of immersion [days] | 0 | 2 | 6 | 15 | 30 | 45 |
|---|---|---|---|---|---|---|
| Contact angle [°] | 179.7 | 179.8 | 179.6 | 179.6 | 179.7 | 179.6 |

Example 4

Polystyrene Plate Structural Object Having Superhydrophobic Surface

Figure 5:
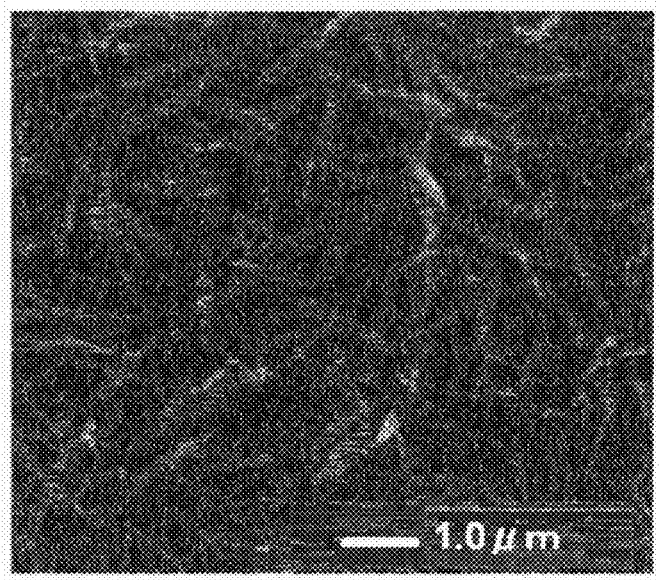
FIG. 5 is a scanning electron micrograph of a polystyrene plate before a hydrophobizing treatment, the polystyrene plate being obtained in Example 4.

A polystyrene plate having a size of 2×2 cm was immersed in concentrated sulfuric acid for three hours. The surface of the plate was then washed with water and methanol, and the plate was dried at room temperature for five minutes. Subsequently, the polystyrene plate was immersed in a 4% aqueous solution of B-PEI (80° C.) and left to stand for 30 seconds. The plate was taken out and left to stand at room temperature for five minutes. Subsequently, the plate was immersed in a mixed solution of a silica source (MS51/water/IPA=0.5/3/3 volume ratio) and then left to stand at room temperature for 20 minutes. The plate was taken out from the solution, the surface of the plate was washed with ethanol, and the plate was dried at room temperature. The surface of the prepared plate was observed with a SEM. FIG. 5 is a photograph of a structural object of nanofibers coating the surface of the plate. It was confirmed that the entire surface of the plate was coated with a nano-grass including a nanofiber as a basic unit.

Meanwhile, 3 mL of a chloroform solution of decyltrimethoxysilane (DTMS) with a concentration of 20% was prepared. The solution was mixed with 30 mL of ethanol, and 0.6 mL of aqueous ammonia (concentration 28%) was then added to the solution to prepare a mixed solution. The polystyrene plate prepared above was immersed in the mixed solution at room temperature for 24 hours, and was then taken out. The surface of the polystyrene plate was washed with ethanol, and the plate was then dried while nitrogen gas was supplied. The prepared structural object had a water contact angle of 176°.

Example 5

Copper Plate Structural Object Having Superhydrophobic Surface

Figure 6:
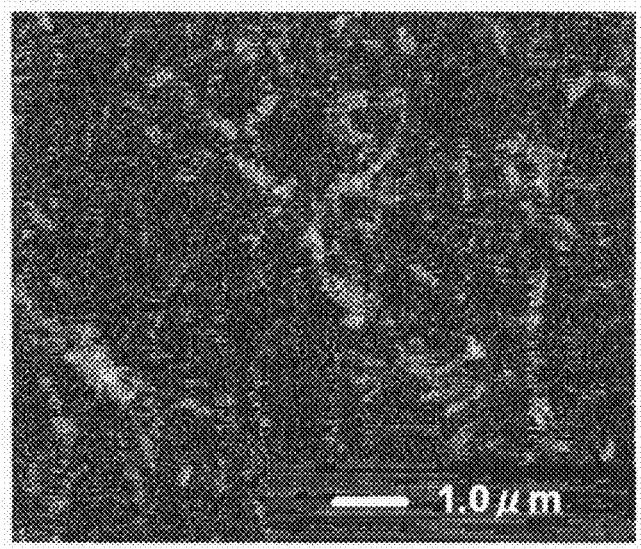
FIG. 6 is a scanning electron micrograph of a copper plate before a hydrophobizing treatment, the copper plate being obtained in Example 5.

A copper plate having a size of 1×1 cm was immersed in a 4% aqueous solution of L-PEI (solution at 80° C.), and left to stand for 30 seconds. The plate was taken out and left to stand at room temperature for five minutes. Subsequently, the plate was immersed in a mixed solution of a silica source (MS51/water/IPA=0.5/3/3) and then left to stand at room temperature for 20 minutes. The plate was taken from the solution. The surface of the plate was washed with ethanol, and the plate was dried at room temperature. The surface of the prepared plate was observed with a SEM (FIG. 6). It was confirmed that the surface of the copper plate was coated with a nano-grass including a nanofiber as a basic unit. A hydrophobizing treatment of the copper plate was performed for 24 hours by the same method as that described in Example 4. The prepared structural object had a water contact angle of 178°.

Example 6

Structural Object Having Superhydrophobic Surface Containing Gold Nanoparticles The nano-grass coated glass plate obtained in Example 1 was immersed in 2 mL of an aqueous solution (1%) of $NaAuCl_4 \cdot 2H_2O$ and heated at 80° C. for one hour. The glass plate was taken out, sequentially washed with distilled water and ethanol, and then dried at room temperature. A light wine-red color appeared on the glass plate thus obtained. This wine-red color is due to a plasmon absorption which shows the presence of gold nanoparticles in the nano-grass coating the inner wall of the glass plate. A reflection spectrum (UV-3500, produced by Hitachi, Ltd.) also showed a plasmon absorption peak attributable to the gold nanoparticles, the absorption peak having a peak top at 520 nm. From the TEM observation of scraped-off nanofibers, gold nanoparticles having a size of 2 to 3 nm were confirmed. A hydrobizing treatment of the above glass plate containing the gold nanoparticles was performed for 24 hours by the same method as that described in Example 4. The prepared structural object had a water contact angle of 179°.

Example 7

Tubular Structural Object Including Glass Tube Having Superhydrophobic Inner Wall Surface The polymer L-PEI obtained in Synthesis Example 1 was added to distilled water, and the mixture was heated to 90° C. to prepare a 4% aqueous solution. A glass pipette (inner diameter 6 mm, length 5 cm) made of soda lime was connected to a syringe with a rubber tube. The above heated aqueous solution of the polymer was drawn into the glass tube in a certain target amount, and the glass tube was then left to stand for 30 seconds. Subsequently, the aqueous solution of the polymer was discharged by a pushing force of the syringe. A L-PEI polymer layer was formed on the inner wall of the glass tube by this operation. The glass tube was left to stand at room temperature for five minutes, and the glass tube was then immersed in 20 mL of a silica source solution of MS51/water (volume ratio 1/1) for 30 minutes. The glass tube was taken out, the inner wall of the glass tube was washed with ethanol, and the glass tube was then dried at room temperature. After this operation, a reflected color of pale blue appeared on the glass tube.

Figure 7:
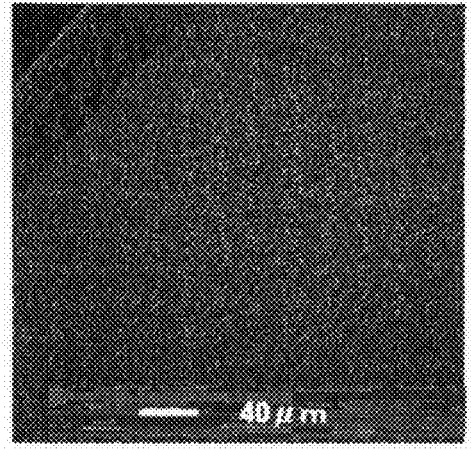
FIG. 7 includes scanning electron micrographs of an inner wall of a glass pipette before a hydrophobizing treatment, the glass pipette being obtained in Example 7. The left side shows a low-magnification photograph, and the right side shows a high-magnification photograph.
Figure 8:
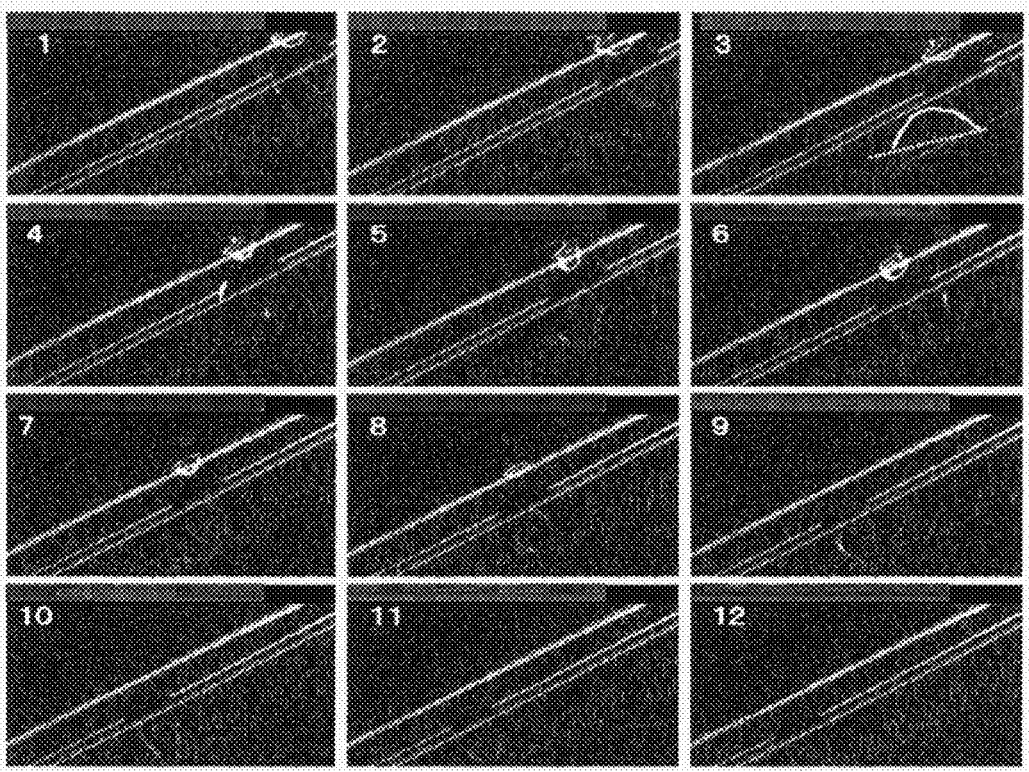
FIG. 8 includes instantaneous high-speed camera photographs of a water droplet flowing in a glass tube after a hydrophobizing treatment, the glass tube being obtained in Example 7. The third photograph of FIG. 8 shows a calculation of the contact angle of the water droplet.

A part of an end of the glass tube obtained through the above process was crushed, and a piece of the broken glass was observed with a SEM. FIG. 7 shows the results of SEM photographs of the inner wall surface of the glass tube. A surface composed of a dense nano-grass including a nanofiber as a unit structure was formed on the inner surface. The glass pipette obtained by the above method was immersed in a mixed solution prepared by mixing 3 mL of a chloroform solution of decyltrimethoxysilane (DTMS) with a concentration of 20%, 30 mL of ethanol, and 0.6 mL of aqueous ammonia (concentration 28%) at room temperature for 24 hours. The pipette was taken out, and the surface thereof was washed with ethanol. The pipette was then dried while nitrogen gas was supplied. When the pipette thus obtained was fixed at an inclination of 27° and a water droplet was dropped in the pipette, the water droplet instantly flowed out of the tube. According to the observation of the flow of the water droplet with an ultra high-speed camera (FIG. 8), the water droplet flowed in the tube in the form of a completely spherical shape while rolling. The rate of the flow of the water droplet at this time was 55.2 cm/sec. In a high-speed camera photograph, the contact angle at the time the water droplet was flowing, that is, an instantaneous contact angle during the dynamic process was calculated by the method shown in FIGS. 8-3. According to the result, the contact angle was found to be 175°. Note that the static contact angle on a coating film prepared on a surface of a plate-shaped glass by the same method was 179.6°.

Figure 9:
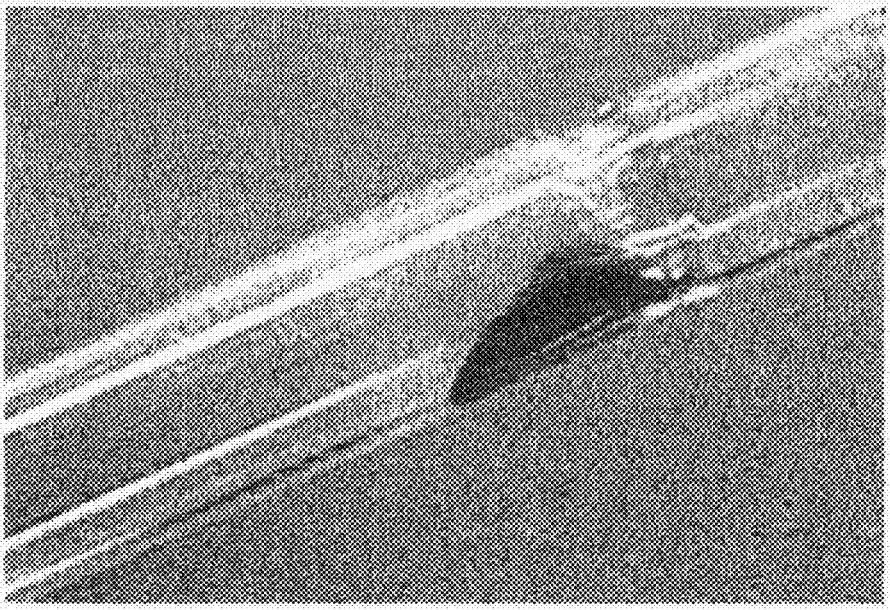
FIG. 9 is a photograph of a comparative example in Example 7. Water adheres to a wall inside a normal glass pipette.

For comparison, a water droplet was dropped in an untreated glass pipette in the same manner. The water remained adhere thereto and did not flow in the tube. FIG. 9 is a digital camera photograph showing the adhering state.

Furthermore, a test of transferring a 10% aqueous sodium chloride solution was conducted using a pipette that exhibited superhydrophobicity. Each time a certain weight of the solution was drawn into the pipette, the solution was transferred to another glass tube to examine the change in the liquid weight due to the transfer of the solution. Even when the solution was repeatedly transferred 20 times, the weight of the transferred solution did not change. That is, when the pipette having a superhydrophobic inner wall was used, the drawn up solution could be perfectly transferred without loss such as adhesion to the pipette.

For comparison, the same test was conducted using a normal pipette. According to the result, it was found that droplets inevitably adhered to and remained on the inner wall of the pipette after the transfer of the solution, and the amount of adhered droplets corresponded to 2% of the drawn up solution.

These results suggest that a pipette having a superhydrophobic inner wall surface need not be washed even after an aqueous sodium chloride solution is transported therewith and can be repeatedly used without further treatment.

Example 8

Tubular Structural Object Including Glass Tube Having Superhydrophobic Inner Wall Surface A polymer layer was formed on the inner surface of a pipette as in Example 7. The pipette was then immersed in a silica source solution for 30 minutes to form a coating film composed of a nano-grass, which is an aggregate of silica composite nanofibers, in the glass pipette tube.

This glass tube was calcined at 500° C. for one hour to remove the polymer from the coating film on the inner wall. The glass tube was then immersed in a mixed solution prepared by mixing 3 mL of a chloroform solution of decyltrimethoxysilane (DTMS) with a concentration of 20%, 30 mL of ethanol, and 0.6 mL of aqueous ammonia (concentration 28%) at room temperature for 24 hours. The pipette was taken out, and the surface thereof was washed with ethanol. The pipette was then dried while nitrogen gas was supplied. The pipette thus obtained was fixed at an inclination of 27°, and an instantaneous contact angle of a water droplet flowing in the pipette during the dynamic process was calculated by the same method as that used in Example 7. As a result, the contact angle was found to be 176°.

[Transfer of Aqueous Copper Nitrate Solution Using Tubular Structural Object Having Superhydrophobic Surface]

In the pipette obtained in Example 8, 2 mL of a 20 wt % aqueous copper nitrate solution was drawn up. The pipette was left to stand at room temperature for one hour, and the drawn up solution was then pushed out. In this case, no water droplets remained on the inner wall of the pipette. The inner wall of the pipette was washed with 1 mL of distilled water. The washing solution was collected, a drop of ethylenediamine was added to the solution, and an absorption spectrum of the resultant solution was then measured. No absorption attributable to copper ions was observed.

For comparison, the same experiment was conducted using a normal pipette. From a solution obtained after washing, a strong absorption attributable to copper ions was observed at 625 nm.

Figure 10:
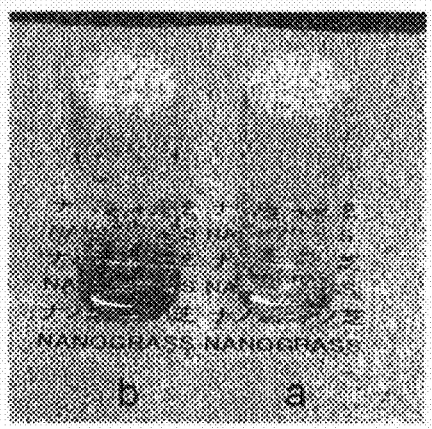
FIG. 10 is a digital photograph of solutions each obtained by allowing a copper nitrate solution to flow in a pipette and then washing the pipette in Example 8. Photograph a shows a washing solution obtained from a pipette having a superhydrophobic inner wall, and photograph b shows a washing solution obtained from a normal glass pipette.
Figure 11:
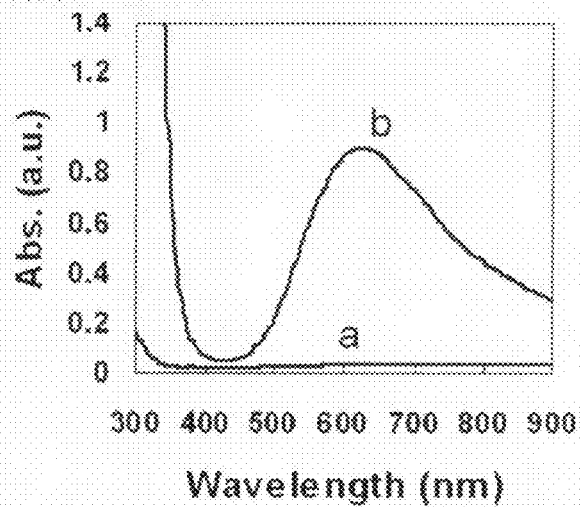
FIG. 11 includes UV-Vis spectra of solutions obtained by allowing a copper nitrate solution to flow in pipettes and then washing the pipettes in Example 8. Line a shows a spectrum of the washing solution obtained from the pipette having the superhydrophobic inner wall, and line b shows a spectrum of the washing solution obtained from the normal glass pipette.

FIG. 10 shows a digital photograph of the collected solutions. FIG. 11 shows UV-Vis spectra. These results strongly suggest that even when an aqueous copper nitrate solution with a high concentration is allowed to flow in a pipette having a superhydrophobic inner wall surface, no copper ions remain.

Example 9

Transfer of Aqueous Cobalt Nitrate Solution Using Tubular Structural Object Including Glass Tube that does not Need Washing and that has Superhydrophobic Inner Wall Surface Two milliliters of a 20 wt % aqueous cobalt nitrate solution was drawn up using a superhydrophobic pipette obtained by the same method as that used in Example 8. The pipette was left to stand at room temperature for one hour, and the drawn up solution was then pushed out. In this case, no water droplets remained on the inner wall of the pipette. The inner wall of the pipette was washed with 1 mL of distilled water. The washing solution was collected, a drop of ethylenediamine was added to the solution, and an absorption spectrum of the resultant solution was then measured. No absorption attributable to cobalt ions was observed.

Figure 12:
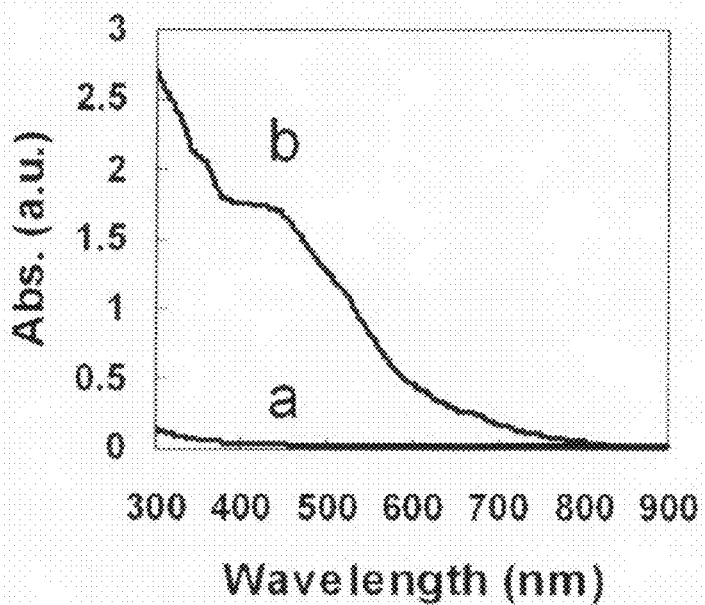
FIG. 12 includes UV-Vis spectra of solutions obtained by allowing a cobalt nitrate solution to flow in pipettes and then washing the pipettes in Example 9. Line a shows a spectrum of a washing solution obtained from a pipette having a superhydrophobic inner wall, and line b shows a spectrum of a washing solution obtained from a normal glass pipette.

For comparison, the same experiment was conducted using a normal pipette. From a solution obtained after washing, an absorption attributable to cobalt ions was broadly observed in the range of 300 to 800 nm. FIG. 12 shows UV-V is spectra.

Example 10

Tubular Structural Object Including Glass Tube Having Superhydrophobic Inner Wall Surface The process up to the calcining treatment was conducted by the same method as that used in Example 8. The pipette after the calcining treatment was immersed in a mixed solution prepared by mixing 3 mL of a chloroform solution of 3-heptafluoropropyloxypropyltrimethoxysilane with a concentration of 20%, 30 mL of ethanol, and 0.6 mL of aqueous ammonia (concentration 28%) at room temperature for 24 hours. The pipette was taken out, the surface of pipette was washed with ethanol, and the pipette was then dried while nitrogen gas was supplied. The pipette thus obtained was fixed at an inclination of 27°, and the instantaneous contact angle of a water droplet flowing in the pipette during the dynamic process was calculated by the same method as that used in Example 7. As a result, the contact angle was found to be 178°.

[Transfer of Aqueous Organic Coloring Matter Solution Using Tubular Structural Object Having Superhydrophobic Surface]

In the pipette obtained in Example 10, 2 mL of a 0.5 wt % aqueous solution of tetra(p-sulfophenyl)porphyrin was drawn up. The pipette was left to stand at room temperature for one hour, and the drawn up solution was then pushed out. In this case, no water droplets remained on the inner wall of the pipette. The inner wall of the pipette was washed with 2 mL of distilled water. The washing solution was collected, and an absorption spectrum of thereof was then measured. No absorption attributable to tetra(p-sulfophenyl) porphyrin was observed.

For comparison, the same experiment was conducted using a normal pipette. From a solution obtained after washing, a strong absorption attributable to tetra(p-sulfophenyl)porphyrin was observed at 440 nm. These results strongly suggest that even when an aqueous organic coloring matter solution is allowed to flow in a pipette having a superhydrophobic inner wall surface, no coloring matter remains.

Example 11

Structural Object Including Cotton String Having Superhydrophobic Surface

Figure 13:
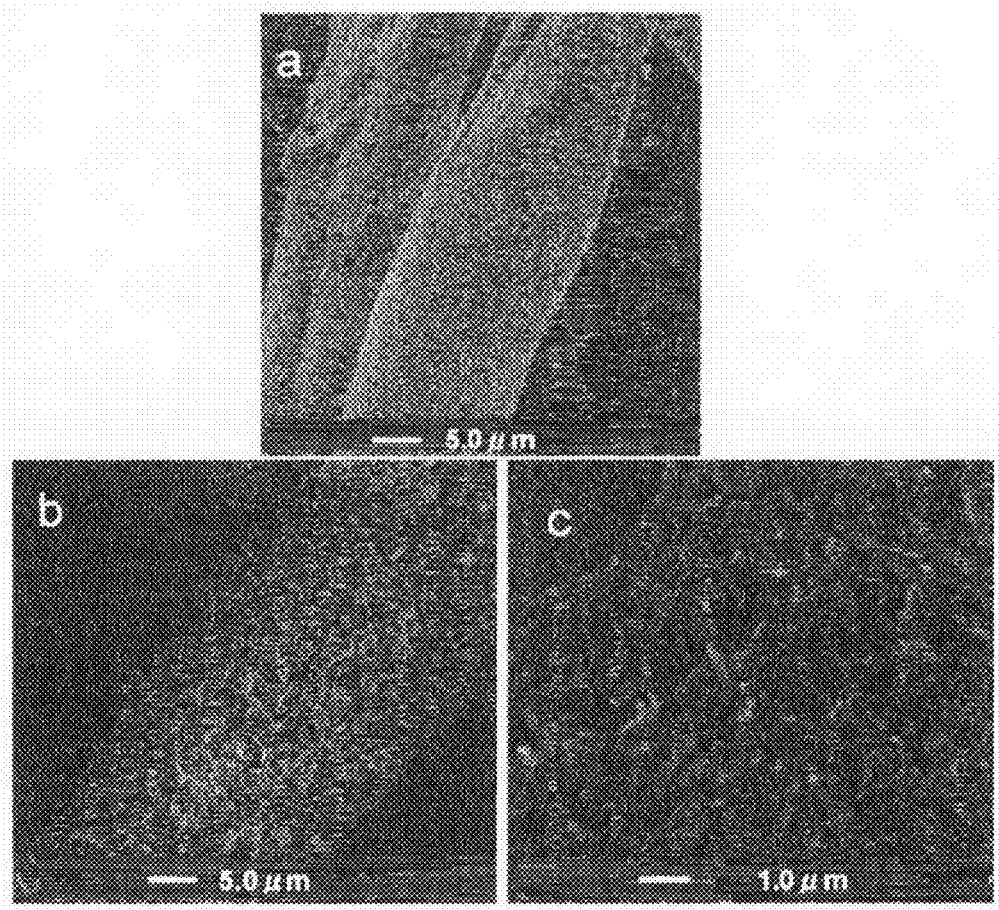
FIG. 13 includes scanning electron micrographs of a kite string in Example 11. a: A photograph of a surface of a kite string. b: A photograph of a surface of a silica-coated kite string before a hydrophobizing treatment. c: A high-magnification photograph of b.

Fifty milligrams of a kite string was immersed in a 2% aqueous solution of L-PEI (solution at 80° C.) and left to stand for 30 seconds. The string was taken out and left to stand at room temperature for 60 minutes. Subsequently, the string was immersed in a mixed solution of a silica source (MS51/water/IPA=0.5/3/3) at room temperature for 20 minutes. The string was taken out from the solution, the surface of the string was washed with ethanol, and the string was dried at room temperature. Thus, a structure of the string, the surface of which was coated with silica, was obtained. The surface of the prepared string was observed with a SEM (FIG. 13). From the comparison between the surfaces before and after the coating with silica, it was confirmed that the surface of the string was coated with a nano-grass including a nanofiber as a basic unit. A hydrophobizing treatment of this string was performed for 24 hours by the same method as that described in Example 4.

The structure thus obtained was immersed in water for 10 minutes and then taken out. The weights before and after the immersion were measured. The structure having a weight of 12 mg before the immersion still had a weight of 12 mg even after the immersion. Wetting with water such as remaining water droplets was not observed on the surface. For comparison, 15 mg of an untreated kite string was immersed in water and then taken out. The string was completely wet, and the weight of the string increased eightfold or more. These results suggest that a string having a superhydrophobic surface can completely repel water.

Example 12

Structural Object Including Filter Paper Having Superhydrophobic Surface

Figure 14:
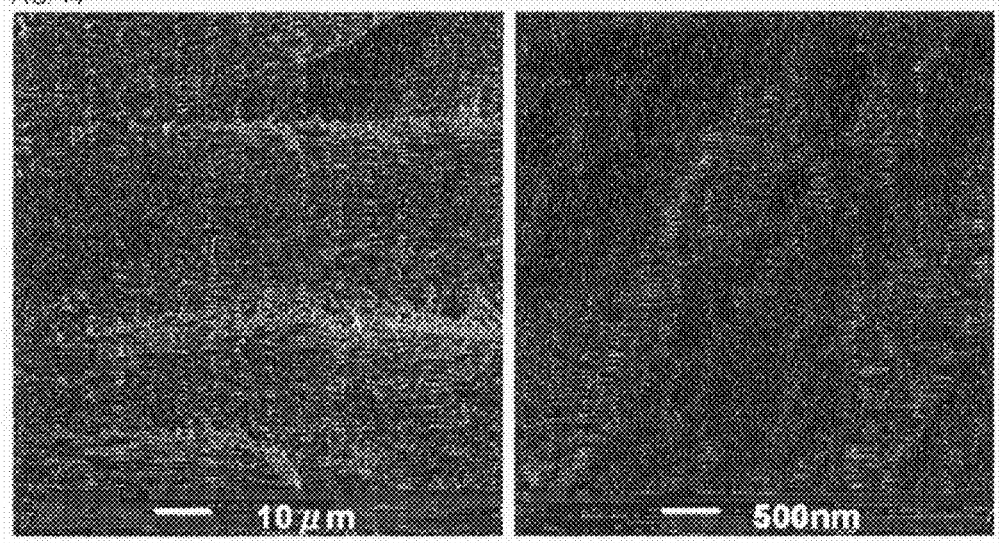
FIG. 14 includes scanning electron micrographs of a filter paper structural object coated with a nanostructure before a hydrophobizing treatment, the structural object being obtained in Example 12. The left side shows a low-magnification photograph, and the right side shows a high-magnification photograph.

Filter paper having a size of 2×2 cm was immersed in a 2% aqueous solution of L-PEI (solution at 80° C.) and left to stand for 30 seconds. The filter paper was taken out and left to stand at room temperature for 60 minutes. Subsequently, the filter paper was immersed in a mixed solution of a silica source (MS51/water/IPA=0.5/3/3) at room temperature for 20 minutes. The filter paper was taken out from the solution, the surface of the filter paper was washed with ethanol, and the filter paper was dried at room temperature. Thus, a structure of the filter paper, the surface of which was coated with silica, was obtained. The surface of the prepared filter paper was observed with an SEM (FIG. 14). From the comparison between the surfaces before and after the coating with silica, it was confirmed that the surface of the filter paper was coated with a nano grass including a nanofiber as a basic unit. A hydrophobizing treatment of this filter paper was performed for 24 hours by the same method as that described in Example 4.

A flat surface of the filter paper thus obtained was placed at an inclination of 3°, and a water droplet was dropped thereon. As a result, the water droplet rolled in the form of a water sphere, was repelled from the surface of the filter paper, and rolled off the surface. Water did not wet the filter paper.

INDUSTRIAL APPLICABILITY

In the structural object having a superhydrophobic surface provided by the present invention, an aqueous solution does not adhere to the surface of the structural object. Accordingly, the application of the structural object can be developed in a wide range of fields such as the industrial field and the medical field, namely, micro-flow paths, microreactors, aqueous solution transportation/transfer devices, blood circulation devices, precise analysis measurement devices, and medical instruments.

The invention claimed is:

1. A structural object coated with a superhydrophobic nanostructure composite, the structural object comprising a superhydrophobic surface obtained by coating a solid substrate (X) with a superhydrophobic nanostructure composite (Z1),
wherein the superhydrophobic nanostructure composite (Z1) is a composite in which a hydrophobic group is bonded to silica (B) in a nanostructure (y1) containing the silica (B) and a polymer (A) having a polyethyleneimine skeleton (a), wherein the polymer (A) is coated with the silica (B).

2. The structural object according to claim 1, wherein the nanostructure (y1) is, as a basic unit, a silica nanofiber having a diameter in the range of 10 to 200 nm and a length in the range of 50 nm to 2 μm, and a long axis of the nanofiber is oriented in a direction substantially perpendicular to the surface of the solid substrate (X).

3. The structural object according to claim 1, wherein the nanostructure (y1) contains a metal ion or a metal nanoparticle.

4. A process for producing a structural object coated with a superhydrophobic nanostructure composite (Z1), the process comprising the steps of:

(1-1) immersing a solid substrate (X) in a solution containing a polymer (A) having a polyethyleneimine skeleton (a) and then taking out the solid substrate (X) to form a polymer layer on a surface of the solid substrate (X);
(1-2) immersing the solid substrate (X) having the polymer layer obtained in the step (1-1) into a silica source solution (B') to deposit silica (B) in the polymer layer formed on the surface of the solid substrate (X), thereby forming a nanostructure (y1), wherein the polymer (A) is coated with the silica (B); and
(1-3) treating the surface of the nanostructure (y1) on the solid substrate obtained in the step (1-2) with a silane coupling agent having a hydrophobic group.

5. A process for producing a structure coated with a superhydrophobic nanostructure composite (Z2) in which a hydrophobic group is bonded to silica (B) in a nanostructure (y2) containing the silica (B) as a main constituent component, the process comprising the steps of:

(2-1) immersing a solid substrate (X) in a solution containing a polymer (A) having a polyethyleneimine skeleton (a) and then taking out the solid substrate (X) to form a polymer layer on a surface of the solid substrate (X);
(2-2) immersing the solid substrate (X) having the resultant polymer layer into a silica source solution (B') to precipitate silica (B) in the polymer layer formed on the surface of the solid substrate (X), thereby forming a nanostructure (y1), wherein the polymer (A) is coated with the silica (B);
(2-3) calcining the solid substrate (X) coated with the nanostructure (y1) obtained in the (2-2) to remove the polymer (A) having the polyethyleneimine skeleton (a) from the nanostructure (y1), thereby forming the nanostructure (y2); and
(2-4) treating the surface of the nanostructure (y2) on the solid substrate obtained in the step (2-3) with a silane coupling agent having a hydrophobic group.

6. The process for producing the structure according to claim 2, wherein the solid substrate (X) is a tubular structure.

7. The process for producing the structure according to claim 3, wherein the solid substrate (X) is a tubular structure.

* * * * *